United States Patent
Shi et al.

(10) Patent No.: US 12,306,360 B1
(45) Date of Patent: May 20, 2025

(54) STRUCTURE FOR SLOW NEUTRON DETECTION AND METHOD FOR SLOW NEUTRON ENERGY SPECTRUM MEASUREMENT

(71) Applicant: Shandong University, Jinan (CN)

(72) Inventors: Quanqi Shi, Jinan (CN); Chenyao Han, Jinan (CN); Shuo Wang, Jinan (CN); Xianghong Jia, Jinan (CN); Xiaoli Wang, Jinan (CN)

(73) Assignee: Shandong University, Jinan (CN)

( * ) Notice: Subject to any disclaimer, the term of this patent is extended or adjusted under 35 U.S.C. 154(b) by 32 days.

(21) Appl. No.: 18/816,954

(22) Filed: Aug. 27, 2024

(30) Foreign Application Priority Data

Nov. 9, 2023 (CN) .......................... 202311481403.8

(51) Int. Cl.
*G01T 3/00* (2006.01)
*G01T 3/02* (2006.01)

(52) U.S. Cl.
CPC ................ *G01T 3/001* (2013.01); *G01T 3/02* (2013.01)

(58) Field of Classification Search
CPC .................................. G01T 3/001; G01T 3/02
See application file for complete search history.

(56) References Cited

FOREIGN PATENT DOCUMENTS

| CN | 115291273 A | 11/2022 |
|---|---|---|
| CN | 15508882 A | 12/2022 |
| RU | 2012151964 A | 6/2014 |

OTHER PUBLICATIONS

*Experimental Methods in Nuclear Physics*, co-edited by Fudan University, Tsinghua University, and Peking University, Atomic Energy Press; English translation of p. 316: "III. Time of Flight Method 1. Basic Principle", (Jun. 1997), 11 pgs.
Application No. CN 2023114814038, First Office Opinion Notice, mailed Dec. 26, 2023, with English translation, 7 pgs.
Application No. CN 2023114814038, Notification of Grant, mailed Jan. 19, 2024, with English translation, 8 pgs.

*Primary Examiner* — Mark R Gaworecki
(74) *Attorney, Agent, or Firm* — Schwegman Lundberg & Woessner, P.A.

(57) ABSTRACT

The present disclosure belongs to the technical field of neutron detection, and it relates to a structure for slow neutron detection and a method for energy spectrum measurement of slow neutrons, wherein the structure for slow neutron detection comprises: a shielding barrel, which is configured as square with an opening; and a detector unit, which is a slow neutron detector with position resolution function, wherein the detector unit is completely wrapped in the shielding barrel, and the detector unit is placed close to one of the sides of the shielding barrel that is perpendicular to the open side of the shielding barrel. When the structure for slow neutron detection moves at a set speed, the incident energy spectrum of slow neutrons can be inversely extrapolated on the basis of the number of slow neutrons at different depths.

7 Claims, 3 Drawing Sheets

STRUCTURE FOR SLOW NEUTRON DETECTION AND METHOD FOR SLOW NEUTRON ENERGY SPECTRUM MEASUREMENT

CLAIM OF PRIORITY

This application claims the benefit of priority under 35 U.S.C. § 119 to Chinese patent application no. 202311481403.8, filed on Nov. 9, 2023, which is incorporated by reference herein in its entirety.

TECHNICAL FIELD

The present disclosure belongs to the technical field of neutron detection. In particular, it relates to a structure for slow neutron detection and a method for energy spectrum measurement of slow neutrons.

BACKGROUND

Neutrons are not electrically charged and do not interact with the electrons in a material when they pass through the material and cannot directly cause ionization. Thus, it is necessary to detect neutrons indirectly through the detection of secondary particles generated by their interaction with atomic nuclei. At present, the international methods for neutron detection mainly include nuclear reaction, nuclear recoil, nuclear fission, activation, etc. Among them, slow neutrons are mainly detected by nuclear reaction using elements with a large reaction cross-section with neutrons (such as $^{10}B$, $^6Li$, $^3He$, etc.), but the nuclear reaction cannot distinguish the incident energy of slow neutrons and can only obtain the slow neutron flux. However, distinguishing the slow neutron flux (<0.x eV) with different energy bands can help to solve some important scientific problems, such as obtaining a finer neutron energy spectrum in the radiation environment to be measured in space, improving the accuracy of inversion of planetary soil composition, etc. Therefore, it is necessary to develop a structure for slow neutron detection that can measure and distinguish the slow neutron flux of different energies.

SUMMARY

The present disclosure provides a structure for slow neutron detection and a method for energy spectrum measurement of slow neutrons, which can effectively measure and distinguish the slow neutron flux with different energies with high reliability.

One objective of the present disclosure is to provide a structure for slow neutron detection, comprising:
- a shielding barrel, which is configured as a square with an opening;
- a detector unit, which is a slow neutron detector with position resolution function, and the detector unit is completely wrapped in the shielding barrel, and the detector unit is placed close to one of the sides of the shielding barrel that is perpendicular to the open side of the shielding barrel.

In some embodiments, the shielding barrel is a square barrel made of Gd, and the thickness of the shielding barrel wall is 1 mm to block neutrons with energy <0.4 eV.

In some embodiments, the shielding barrel is a square barrel made of Cd, and the thickness of the shielding barrel wall is 1 mm to block neutrons with energy <0.4 eV.

In some embodiments, the shielding barrel is a square barrel made of aluminum-based boron carbide with a boron carbide content of 40%, and the thickness of the shielding barrel wall is 5 mm to block neutrons with energy <2 eV.

In some embodiments, the depth of the shielding barrel is 10 cm, and the bottom area of the space into the barrel is 10*10 cm².

Another objective of the present disclosure is to provide a method for energy spectrum measurement of slow neutrons, using the structure for slow neutron detection described in the above objective, comprising the following steps:

S1. placing the structure for slow neutron detection on a moving equipment with a detector unit of the structure is configured to face the movement direction of the equipment directly to obtain the number of slow neutrons reaching different depths within a shielding barrel, and obtaining slow neutron depth distribution spectrum based on the number of slow neutrons reaching different depths, wherein the slow neutron depth distribution spectrum is divided into N channels; and S2. dividing the energy range of slow neutrons to be detected into N portions corresponding to $0$-$E_1$, $E_1$-$E_2$, ..., $E_{N-1}$-$E_N$ according to the relationship between neutrons' energies and the maximum depths of the slow neutrons that can be reached within the shielding barrel obtained through simulation, wherein $E_N$=E and E is the maximum energy of slow neutrons that can be shielded by the shielding barrel, then the number of slow neutrons in the Nth channel of the slow neutron depth distribution spectrum is generated by the neutrons with energy in the range of $E_{N-1}$-$E_N$, and obtaining the contribution of neutrons with energy in the range of $E_{N-1}$-$E_N$ to the number in N channels of the slow neutron depth distribution spectrum by combining the probability ratio of neutrons with energy in the range of $E_{N-1}$-$E_N$ reaching different depths within the shielding barrel obtained through simulation and the number in the Nth channel of the slow neutron depth distribution spectrum; and S3. the number in the (N−1)th channel of the slow neutron depth distribution spectrum is generated by neutrons with energy in the ranges of $E_{N-2}$-$E_{N-1}$ and $E_{N-1}$-$E_N$, wherein the contribution of the neutrons with energy in the range of $E_{N-1}$-$E_N$ to the number in the (N−1)th channel of the slow neutron depth distribution spectrum is obtained by step S2, and the contribution of the neutrons with energy in the range of $E_{N-2}$-$E_{N-1}$ to the number in the (N−1)th channel of the slow neutron depth distribution spectrum is equal to the number in the (N−1)th channel of the slow neutron depth distribution spectrum minus the number contributed by neutrons with energy in the range of $E_{N-1}$-$E_N$ in the (N−1)th channel; and obtaining the contribution of neutrons with energy in the range of $E_{N-2}$-$E_{N-1}$ to the numbers in the first (N−1) channels of the slow neutron depth distribution spectrum by combining the probability of neutrons with energy in the range of $E_{N-2}$-$E_{N-1}$ reaching different depths within the shielding barrel obtained through simulation and the number in the (N−1)th channel of the slow neutron depth distribution spectrum, wherein the first (N−1) channels comprising the 1st, 2nd, ..., (N−2)th, and (N−1)th channel; and S4. the number in the (N−2)th channel of the slow neutron depth distribution spectrum is generated by neutrons with energy in the ranges of $E_{N-3}$-$E_{N-2}$, $E_{N-2}$-$E_{N-1}$ and $E_{N-1}$-$E_N$, wherein the contribution of the neutrons with energy in the range of $E_{N-1}$-$E_N$ to the number in the (N−2)th channel of the slow neutron depth distribution spectrum is obtained by step S2, the contribution of the neutrons with energy in the range of $E_{N-2}$-$E_{N-1}$ to the number in the (N−2)th channel of the slow neutron depth distribution spectrum is obtained by step S3, and the contribution of the neutrons with energy in the range of $E_{N-3}$-$E_{N-2}$ to the number in the (N−2)th channel of the slow neutron depth distribution spectrum is equal to the number of slow neutrons in the (N−2)th channel of the slow neutron depth distribution spectrum minus the number contributed by the neutrons with energy in the range of $E_{N-2}$-$E_{N-1}$ and $E_{N-1}$-$E_N$ in the (N−2)th channel, and obtaining the contribution of neutrons with energy in the range of $E_{N-3}$-$E_{N-2}$ to the numbers in the first (N−2) channels of the slow neutron depth distribution spectrum by combining the probability of neutrons with energy in the range of $E_{N-3}$-$E_{N-2}$ reaching different depths within the shielding barrel obtained through simulation and the number in the (N−2)th channel of the slow neutron depth distribution spectrum, wherein the first (N−2) channels comprising the 1st, 2nd, . . . , (N−3)th, and (N−2)th channel, and similarly, the slow neutron energy spectrum can be obtained after the contributions of neutrons in different energy ranges to all channels of the slow neutron depth distribution spectrum in the shielded barrel were obtained; and in step S1, assuming that the movement direction of all slow neutrons is perpendicular to the bottom surface of the shielding barrel of the structure for slow neutron detection, then the relationship between the ratio of the maximum depth of neutrons reaching within the shielding barrel to the width of the shielding barrel, the neutron energy and the speed of shielding barrel is described by:

$$\frac{d_{max}}{w} = \frac{v_n \cdot t}{w} = v_n \cdot \frac{1}{v} = \frac{1}{v} \cdot \sqrt{\frac{2E_k}{m_0}} \quad (1)$$

wherein $d_{max}$ is the maximum depth of a neutron reaching within the shielding barrel, w is the width of the shielding barrel along the movement direction, $v_n$ is the speed of a neutron, v is the speed of the shielding barrel, $E_k$ is the kinetic energy of a neutron, and $m_0$ is the rest mass of a neutron; and when the speed of the shielding barrel remains constant, there is a monotonic positive correlation between the kinetic energy of neutrons and the ratio of the maximum depth of neutrons reaching within the shielding barrel to the width of the shielding barrel, thus the energy of slow neutrons can be distinguished based on that to obtain the spectrum of slow neutrons.

In some embodiments, in step S1, resolving the slow neutron energy on the basis of the parameters of the structure for slow neutron detection, which comprises:

setting the maximum depth that a neutron with kinetic energy $E_{k1}$ can reach within the shielding barrel be $d_{max1}$ and setting the maximum depth that a neutron with kinetic energy $E_{k2}$ can reach within the shielding barrel be $d_{max2}$, respectively, then:

$$d_{max1} = \frac{w}{v} \cdot \sqrt{\frac{2E_{k1}}{m_0}} \quad (2)$$

$$d_{max2} = \frac{w}{v} \cdot \sqrt{\frac{2E_{k2}}{m_0}} \quad (3)$$

and dividing equation (2) by equation (3), then:

$$\frac{d_{max1}}{d_{max2}} = \sqrt{\frac{E_{k1}}{E_{k2}}} \quad (4)$$

and then the resolution of slow neutron energy by the structure for slow neutron detection can be characterized via equation (4).

Compared with the prior art, the advantages and positive effects of the present disclosure are:

(1) The structure for slow neutron detection of the present disclosure is capable of measuring the slow neutron energy spectrum through its structural design, and effectively distinguishing the slow neutron flux of different energies with high reliability.

(2) The structure for slow neutron detection of the present disclosure is very compact, occupies little space, and can be applied in miniaturized low-power equipment.

(3) The method for energy spectrum measurement of slow neutrons of the present disclosure is based on the above structure for slow neutron detection, based on the structure for slow neutron detection moving at a set speed, detecting the number of slow neutrons reaching different depths within the shielding barrel, obtaining slow neutron depth distribution spectrum, and then calculate the incident slow neutron energy spectrum based on the slow neutron depth distribution spectrum, which is able to efficiently distinguish the slow neutron flux of different energies.

List of reference signs: shielding barrel #1, opening #11, detector unit #2.

DETAILED DESCRIPTION

Exemplary embodiments of the disclosure will be described in the following. It should be understood that elements, structures, and features in one embodiment may also be beneficially incorporated into other embodiments without further description.

In the disclosure, it should be noted that the terms "upper", "lower", "left", "right", "into", "outside" and the like indicate orientation or positional relationships based on the positional relationships shown in the accompanying drawings, and are only intend to facilitate and simplify the description and do not indicate or imply that the equipment or element referred to must have a particular orientation, be constructed and operated with a particular orientation, thus, the terms are not restrictive. Furthermore, the terms "first", "second", etc. are used for description only and are not to be construed as indicating or implying relative importance.

Figure 1:
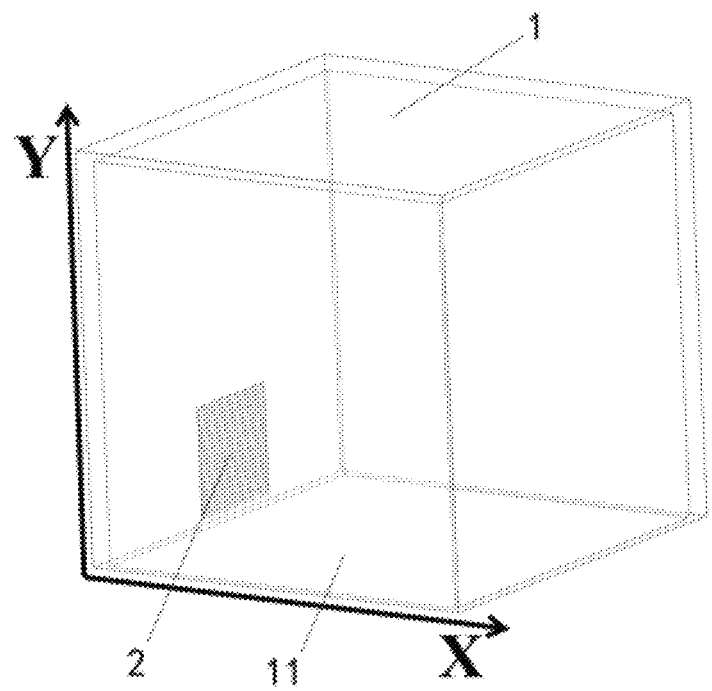
FIG. 1 shows schematically the three-dimensional structure of a structure for slow neutron detection according to the present disclosure.
Figure 2:
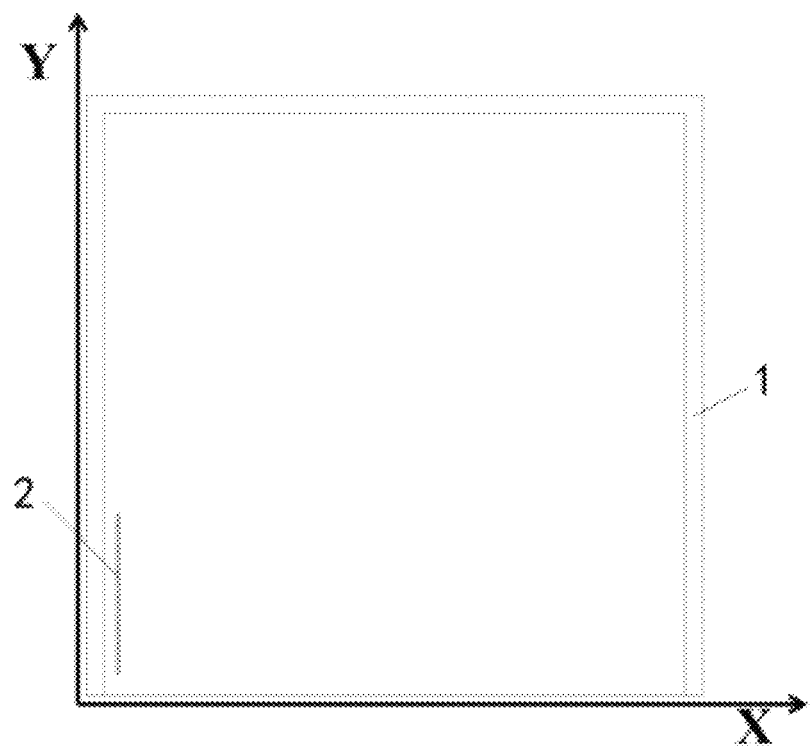
FIG. 2 shows schematically the front structure of a structure for slow neutron detection according to the present disclosure.
Figure 3:
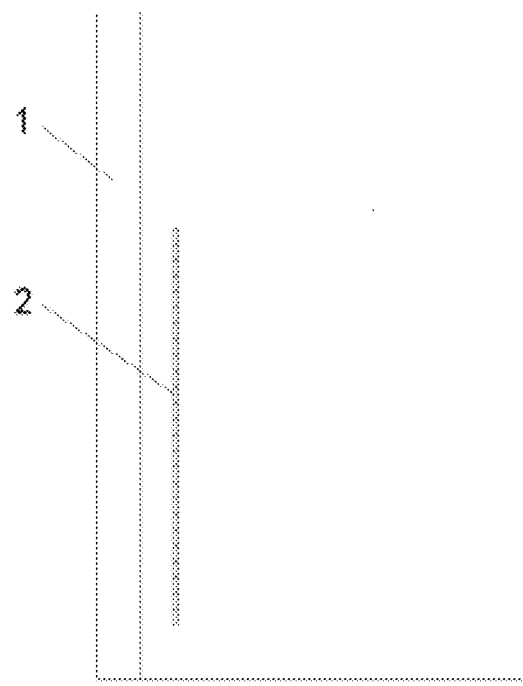
FIG. 3 shows schematically the partially enlarged view of a structure for slow neutron detection according to the present disclosure.

Referring to FIGS. 1 to 3, one objective of the present disclosure is to provide a structure for slow neutron detection, comprising:

a shielding barrel 1, which is configured as a square with an opening 11;

a detector unit 2, which is a slow neutron detector with position resolution function, and the detector unit 2 is completely wrapped in the shielding barrel 1, and the detector unit 2 is placed close to one of the sides of the shielding barrel 1 that is perpendicular to the open side of the shielding barrel 1.

In particular, in some embodiments, the slow neutron detector uses, but is not limited to, a charged particle detector with a slow neutron conversion layer, a scintillator detector with a slow neutron sensitive element, etc., which is capable of detecting slow neutrons but is unable to distinguish energy of slow neutrons.

In particular, in some embodiments, the detector unit 2 is placed close to the left side of the shielding barrel 1 that is perpendicular to the open side of the shielding barrel 1. It should be noted that the position of the detector unit may be set according to the actual needs, and is not limited to being placed close to the left side of the shielding barrel 1 perpendicular to the open side of the shielding barrel 1, but may also be placed close to the right side, or the front side, or the rear side, of the shielding barrel 1 perpendicular to the open side of the shielding barrel 1.

In particular, in some embodiments, the shielding barrel is a square barrel made of Gd, and the thickness of the shielding barrel wall is 1 mm to block neutrons with energy <0.4 eV.

In particular, in some embodiments, the shielding barrel is a square barrel made of Cd, and the thickness of the shielding barrel wall is 1 mm to block neutrons with energy <0.4 eV.

In particular, in some embodiments, the shielding barrel is a square barrel made of aluminum-based boron carbide with a boron carbide content of 40%, and the thickness of the shielding barrel wall is 5 mm to block neutrons with energy <2 eV.

It should be noted that the thickness of the shielding barrel varies depending on the material used to make the barrel, as long as it is capable of blocking slow neutrons of a certain energy (which can be set according to the actual needs).

In some embodiments, the depth of the shielding barrel is 10 cm, and the bottom area of the space into the barrel is 10*10 cm². It should be noted that the depth of the shielding barrel and the bottom area of the space inside the barrel are limited by the size of the equipment and the size of the detector, for example, if placed on a satellite, they are limited by the volume of the satellite. Therefore, the depth of the shielding barrel and the bottom area can be adjusted according to the actual size of the equipment and the detector, and is not limited to a depth of 10 cm and a bottom area of 10*10 cm².

When the structure for slow neutron detection described above is used for energy spectrum measurement, it is necessary to place the structure on a moving equipment with a detector unit configured to face the movement direction of the equipment directly, during the moving of the equipment, the detector unit detects the number of slow neutrons reaching different depths within the shielding barrel, so as to generate slow neutron depth distribution spectrum based on the number of slow neutrons at different depths, and then calculate slow neutron energy spectrum based on the slow neutron depth distribution spectrum.

The structure for slow neutron detection described above is capable of measuring the slow neutron energy spectrum, and effectively distinguishing the slow neutron flux of different energies with high reliability. In addition, it is very compact, occupies little space, and can be applied in miniaturized low-power equipment.

Referring to FIG. 1, another objective of the present disclosure is to provide a method for energy spectrum measurement of slow neutrons, using the structure for slow neutron detection described above, comprising the following steps:

S1. placing the structure for slow neutron detection on a moving equipment with a detector unit of the structure is configured to face the movement direction of the equipment directly to obtain the number of slow neutrons reaching different depths within a shielding barrel, and obtaining slow neutron depth distribution spectrum based on the number of slow neutrons at different depths, wherein the slow neutron depth distribution spectrum is divided into N channels.

In particular, assuming that the movement direction of all slow neutrons is perpendicular to the bottom surface of the shielding barrel of the structure for slow neutron detection, then the relationship between the ratio of the maximum depth of a neutron reaching within the shielding barrel to the width of the shielding barrel, the energy of a neutron and the speed of shielding barrel is described by:

$$\frac{d_{max}}{w} = \frac{v_n \cdot t}{w} = v_n \cdot \frac{1}{v} = \frac{1}{v} \cdot \sqrt{\frac{2E_k}{m_0}} \quad (1)$$

wherein $d_{max}$ is the maximum depth of a neutron reaching within the shielding barrel, w is the width of the shielding barrel along the movement direction, $v_n$ is the speed of a neutron, v is the speed of the shielding barrel, $E_k$ is the kinetic energy of a neutron, and $m_0$ is the rest mass of a neutron.

It should be noted that the relationship between the kinetic energy of the neutron $E_k$ and the speed of a neutron is obtained according to the classical mechanics formula because of the low energy of the slow neutron and its speed is much less than the speed of light.

when the speed of the shielding barrel remains constant, there is a monotonic positive correlation between the kinetic energy of neutrons and the ratio of the maximum depth of neutrons reaching within the shielding barrel to the width of the shielding barrel, thus the energy of slow neutrons can be distinguished based on that to obtain the spectrum of slow neutrons.

In particular, resolving the slow neutron energy on the basis of the parameters of the structure for slow neutron detection, which comprises:

setting the maximum depth that a neutron with kinetic energy $E_{k1}$ can reach within the shielding barrel be $d_{max1}$ and setting the maximum depth that a neutron with kinetic energy $E_{k2}$ can reach within the shielding barrel be $d_{max2}$ respectively, then:

$$d_{max1} = \frac{w}{v} \cdot \sqrt{\frac{2E_{k1}}{m_0}} \qquad (2)$$

$$d_{max2} = \frac{w}{v} \cdot \sqrt{\frac{2E_{k2}}{m_0}} \qquad (3)$$

and dividing equation (2) by equation (3), then:

$$\frac{d_{max1}}{d_{max2}} = \sqrt{\frac{E_{k1}}{E_{k2}}} \qquad (4)$$

and then the resolution of slow neutron energy by the structure for slow neutron detection can be characterized via equation (4).

Therefore, when the detector unit is configured to face the movement direction of the equipment directly, the detector unit measures the number of slow neutrons reaching different depths within the shielding barrel, and generates the slow neutron depth distribution spectrum based on the number of slow neutrons at different depths.

S2. dividing the energy range of slow neutrons to be detected into N portions corresponding to $0$-$E_1$, $E_1$-$E_2$, . . . , $E_{N-1}$-$E_N$ according to the relationship between neutrons' energies and the maximum depths of the slow neutrons that can be reached within the shielding barrel obtained through simulation, wherein $E_N$=E and E is the maximum energy of slow neutrons that can be shielded by the shielding barrel, then the number of slow neutrons in the Nth channel of the slow neutron depth distribution spectrum is generated by the neutrons with energy in the range of $E_{N-1}$-$E_N$, and obtaining the contribution of neutrons with energy in the range of $E_{N-1}$-$E_N$ to the number in N channels of the slow neutron depth distribution spectrum by combining the probability ratio of neutrons with energy in the range of $E_{N-1}$-$E_N$ reaching different depths within the shielding barrel obtained through simulation and the number in the Nth channel of the slow neutron depth distribution spectrum; and S3. the number in the (N−1)th channel of the slow neutron depth distribution spectrum is generated by neutrons with energy in the ranges of $E_{N-2}$-$E_{N-1}$ and $E_{N-1}$-$E_N$, wherein the contribution of the neutrons with energy in the range of $E_{N-1}$-$E_N$ to the number in the (N−1)th channel of the slow neutron depth distribution spectrum is obtained by step S2, and the contribution of the neutrons with energy in the range of $E_{N-2}$-$E_{N-1}$ to the number in the (N−1)th channel of the slow neutron depth distribution spectrum is equal to the number in the (N−1)th channel of the slow neutron depth distribution spectrum minus the number contributed by neutrons with energy in the range of $E_{N-1}$-$E_N$ in the (N−1)th channel; and obtaining the contribution of neutrons with energy in the range of $E_{N-2}$-$E_{N-1}$ to the numbers in the first (N−1) channels of the slow neutron depth distribution spectrum by combining the probability of neutrons with energy in the range of $E_{N-2}$-$E_{N-1}$ reaching different depths within the shielding barrel obtained through simulation and the number in the (N−1)th channel of the slow neutron depth distribution spectrum, wherein the first (N−1) channels comprising the 1st, 2nd, . . . , (N−2)th, and (N−1)th channel; and S4. the number in the (N−2)th channel of the slow neutron depth distribution spectrum is generated by neutrons with energy in the ranges of $E_{N-3}$-$E_{N-2}$, $E_{N-2}$-$E_{N-1}$ and $E_{N-1}$-$E_N$, wherein the contribution of the neutrons with energy in the range of $E_{N-1}$-$E_N$ to the number in the (N−2)th channel of the slow neutron depth distribution spectrum is obtained by step S2, the contribution of the neutrons with energy in the range of $E_{N-2}$-$E_{N-1}$ to the number in the (N−2)th channel of the slow neutron depth distribution spectrum is obtained by step S3, and the contribution of the neutrons with energy in the range of $E_{N-3}$-$E_{N-2}$ to the number in the (N−2)th channel of the slow neutron depth distribution spectrum is equal to the number of slow neutrons in the (N−2)th channel of the slow neutron depth distribution spectrum minus the number contributed by the neutrons with energy in the range of $E_{N-2}$-$E_{N-1}$ and $E_{N-1}$-$E_N$ in the (N−2)th channel, and obtaining the contribution of neutrons with energy in the range of $E_{N-3}$-$E_{N-2}$ to the numbers in the first (N−2) channels of the slow neutron depth distribution spectrum by combining the probability of neutrons with energy in the range of $E_{N-3}$-$E_{N-2}$ reaching different depths within the shielding barrel obtained through simulation and the number in the (N−2)th channel of the slow neutron depth distribution spectrum, wherein the first (N−2) channels comprising the 1st, 2nd, . . . , (N−3)th, and (N−2)th channel, and similarly, the slow neutron energy spectrum can be obtained after the contributions of neutrons in different energy ranges to all channels of the slow neutron depth distribution spectrum in the shielded barrel were obtained.

In particular, the above method for energy spectrum measurement of slow neutrons is specified by the example of obtaining N=5 channels of slow neutron depth distribution spectrum in step S1.

In step S2, dividing the energy range of slow neutrons to be detected into 5 portions corresponding to $0$-$E_1$, $E_1$-$E_2$, $E_2$-$E_3$, $E_3$-$E_4$, $E_4$-$E_5$ according to the relationship between neutrons' energies and the maximum depths of the slow neutrons that can be reached within the shielding barrel obtained through simulation, wherein $E_5$=E and E is the maximum energy of slow neutrons that can be shielded by the shielding barrel, then the number of slow neutrons in the 5th channel of the slow neutron depth distribution spectrum is generated by the neutrons with energy in the range of $E_4$-$E_5$, and obtaining the contribution of neutrons with energy in the range of $E_4$-$E_5$ to the number in 5 channels (the 1st channel, the 2nd channel, the 3rd channel, the 4th channel, the 5th channel) of the slow neutron depth distribution spectrum by combining the probability ratio of neutrons with energy in the range of $E_4$-$E_5$ reaching different depths within the shielding barrel obtained through simulation and the number in the 5th channel of the slow neutron depth distribution spectrum.

In step S3, the number in the 4th channel of the slow neutron depth distribution spectrum is generated by neutrons with energy in the ranges of $E_3$-$E_4$ and $E_4$-$E_5$, wherein the contribution of the neutrons with energy in the range of $E_4$-$E_5$ to the number in the 4th channel of the slow neutron depth distribution spectrum is obtained by step S2, and the contribution of the neutrons with energy in the range of $E_3$-$E_4$ to the number in the 4th channel of the slow neutron depth distribution spectrum is equal to the number in the 4th channel of the slow neutron depth distribution spectrum minus the number contributed by neutrons with energy in the range of $E_4$-$E_5$ in the 4th channel. Obtain the contribution of neutrons with energy in the range of $E_3$-$E_4$ to the numbers in the first 4 channels (the 1st channel, the 2nd channel, the 3rd channel, the 4th channel) of the slow neutron depth distribution spectrum by combining the probability of neutrons with energy in the range of $E_3$-$E_4$ reaching different depths within the shielding barrel obtained through simulation and the number in the 4th channel of the slow neutron depth distribution spectrum.

In step S4, the number in the 3rd channel of the slow neutron depth distribution spectrum is generated by neutrons with energy in the ranges of $E_2$-$E_3$, $E_3$-$E_4$ and $E_4$-$E_5$, wherein the contribution of the neutrons with energy in the range of $E_4$-$E_5$ to the number in the 3rd channel of the slow neutron depth distribution spectrum is obtained by step S2, the contribution of the neutrons with energy in the range of $E_3$-$E_4$ to the number in the 3rd channel of the slow neutron depth distribution spectrum is obtained by step S3, and the contribution of the neutrons with energy in the range of $E_2$-$E_3$ to the number in the 3rd channel of the slow neutron depth distribution spectrum is equal to the number of slow neutrons in the 3rd channel of the slow neutron depth distribution spectrum minus the number contributed by the neutrons with energy in the range of $E_3$-$E_4$ and $E_4$-$E_5$ in the 3rd channel. Obtain the contribution of neutrons with energy in the range of $E_2$-$E_3$ to the numbers in the first 3 channels (the 1st channel, the 2nd channel, the 3rd channel) of the slow neutron depth distribution spectrum by combining the probability of neutrons with energy in the range of $E_2$-$E_3$ reaching different depths within the shielding barrel obtained through simulation and the number of slow neutrons in the 3rd channel of the slow neutron depth distribution spectrum.

In step S4, the number in the 2nd channel of the slow neutron depth distribution spectrum is generated by neutrons with energy in the ranges of $E_1$-$E_2$, $E_2$-$E_3$, $E_3$-$E_4$ and $E_4$-$E_5$, wherein the contribution of the neutrons with energy in the range of $E_4$-$E_5$ to the number in the 2nd channel of the slow neutron depth distribution spectrum is obtained by step S2, the contribution of the neutrons with energy in the range of $E_3$-$E_4$ to the number in the 2nd channel of the slow neutron depth distribution spectrum is obtained by step S3, the contribution of the neutrons with energy in the range of $E_2$-$E_3$ to the number in the 2nd channel of the slow neutron depth distribution spectrum is obtained by step S4, and the contribution of the neutrons with energy in the range of $E_1$-$E_2$ to the number in the 2nd channel of the slow neutron depth distribution spectrum is equal to the number in the 2nd channel of the slow neutron depth distribution spectrum minus the number contributed by the neutrons with energy in the range of $E_2$-$E_3$, $E_3$-$E_4$, and $E_4$-$E_5$ in the 2nd channel. Obtain the contribution of neutrons with energy in the range of $E_1$-$E_2$ to the numbers in the first 2 channels (the 1st channel, the 2nd channel) of the slow neutron depth distribution spectrum by combining the probability of neutrons with energy in the range of $E_1$-$E_2$ reaching different depths within the shielding barrel obtained through simulation and the number of slow neutrons in the 2nd channel of the slow neutron depth distribution spectrum.

In step S4, the number in the 1st channel of the slow neutron depth distribution spectrum is generated by neutrons with energy in the ranges of 0-$E_1$, $E_1$-$E_2$, $E_2$-$E_3$, $E_3$-$E_4$, and $E_4$-$E_5$, wherein the contribution of the neutrons with energy in the range of $E_4$-$E_5$ to the number in the 1st channel of the slow neutron depth distribution spectrum is obtained by step S2, the contribution of the neutrons with energy in the range of $E_3$-$E_4$ to the number in the 1st channel of the slow neutron depth distribution spectrum is obtained by step S3, the contribution of the neutrons with energy in the ranges of $E_1$-$E_2$ and $E_2$-$E_3$ to the number in the 1st channel of the slow neutron depth distribution spectrum both are obtained by step S4, and the contribution of the neutrons with energy in the range of 0-$E_1$ to the number in the 1st channel of the slow neutron depth distribution spectrum is equal to the number in the 1st channel of the slow neutron depth distribution spectrum minus the number contributed by the neutrons with energy in the range of $E_1$-$E_2$, $E_2$-$E_3$, $E_3$-$E_4$, and $E_4$-$E_5$ in the 1st channel.

Thus, the contributions of neutrons in different energy ranges to all five channels of the slow neutron depth distribution spectrum in the shielded barrel can be obtained to calculate the slow neutron energy spectrum.

The method for energy spectrum measurement of slow neutrons of the present disclosure is based on the above structure for slow neutron detection, detecting the number of slow neutrons reaching different depths within the shielding barrel of the structure, obtaining the slow neutron depth distribution spectrum based on the number of slow neutrons, and then calculating the incident slow neutron energy spectrum efficiently based on the slow neutron depth distribution spectrum.

The effectiveness of the structure for slow neutron detection and the method for energy spectrum measurement of slow neutrons described above was verified by the following simulations based on Geant4 software.

The shielding barrel, which is configured as a square with an opening, is made of Gd, wherein the thickness of the shielding barrel wall is 1 mm, the depth of the shielding barrel is 10 cm, and the bottom area of the space into the shielding barrel is 10*10 cm$^2$, which is capable of blocking neutrons with energy <0.4 eV.

The detector unit is configured as a position-sensitive thermal neutron detector.

The detector unit is completely wrapped in the shielding barrel, and the detector unit is placed close to one side of the shielding barrel that is perpendicular to the open side of the shielding barrel.

The movement direction of the shielding barrel is configured to be the +X direction, and in the simulation, neutrons with randomly distributed energy between 0 and 0.4 eV are vertically incident into the barrel at the opening of the shielding barrel, and the relative speed direction of the shielding barrel is superimposed to the initial speed direction of the neutrons, and the number of slow neutrons reaching different depths within the shielding barrel is detected by the detector unit. For the case that the width of the shielding barrel in X direction is 10 cm and the speed of the barrel is 1.3 km/s, the probabilities of neutrons with different energies reaching different depths within the shielding barrel are shown in FIG. 4, and this probability distribution can be used for the subsequent extraction of the slow neutron energy spectrum information.

Figure 4:
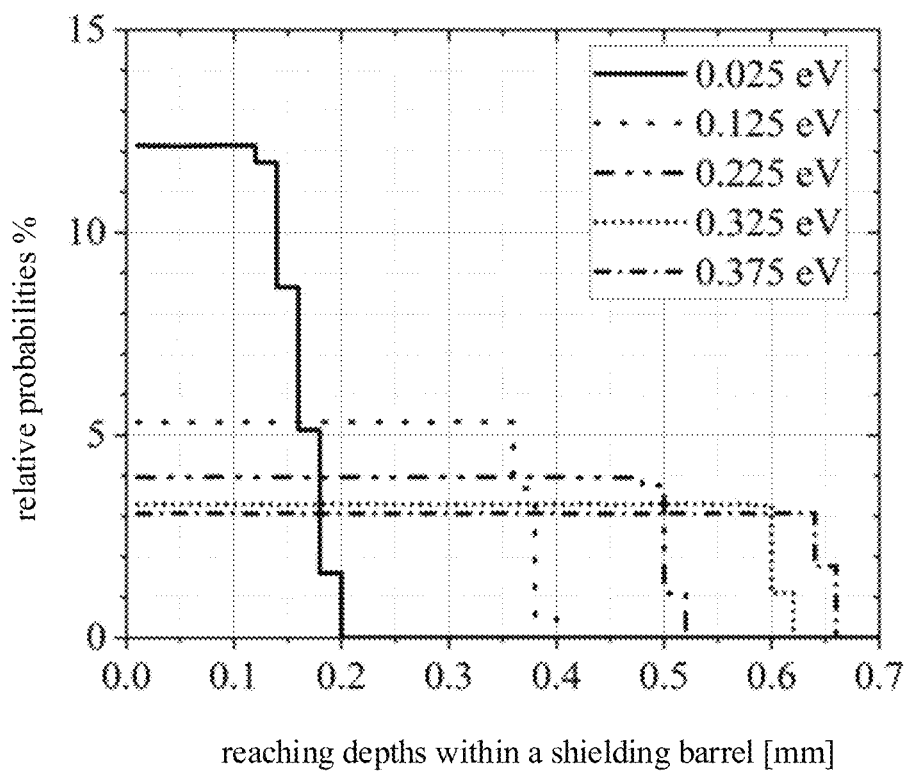
FIG. 4 shows schematically the probability of neutrons of different energies reaching different depths within a shielding barrel according to the present disclosure.
Figure 5:
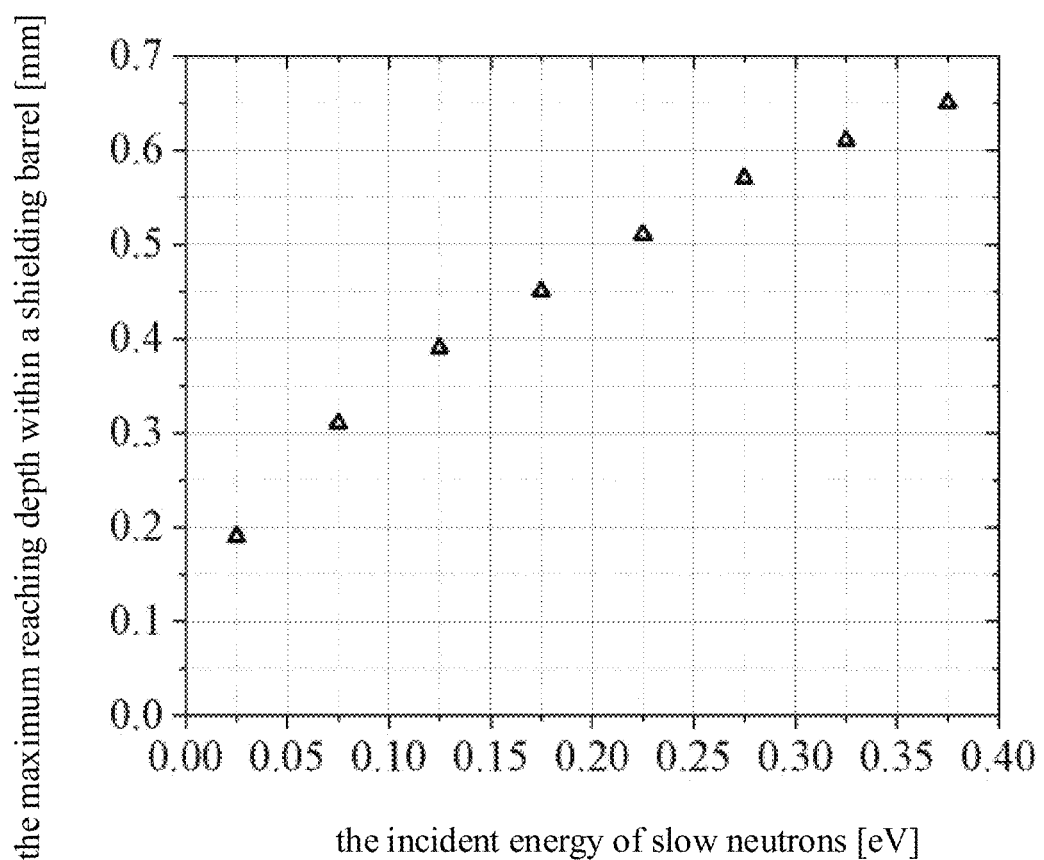
FIG. 5 shows schematically a graph of the relationship between the maximum depth of neutrons reaching the shielding barrel and the neutron energy according to the present disclosure.

The maximum depth of the shielding barrel that can be reached by neutrons of different energies is obtained by simulation, as shown in FIG. 5, which shows that in the energy range of 0-0.4 eV, the higher the energy of the neutron, the deeper the maximum depth in the shielding barrel that can be reached by the neutron, and thus the slow neutrons of different energies can be distinguished. Assuming that there are N channels in the depth distribution spectrums in the shielding barrel, according to the simulation results in FIG. 5, the slow neutron energy measurement range can also be divided into N portions corresponding to 0-$E_1$, $E_1$-$E_2$, ..., $E_{N-1}$-$E_N$, wherein $E_N$=0.4 eV, then the signals of the Nth channel are only generated by neutrons with energy in the range of $E_{N-1}$-$E_N$, and the probabilities of neutrons with energy in the $E_{N-1}$-$E_N$ range reaching different depths within the shielding barrel are shown in FIG. 4, and then obtaining the contribution of neutrons with energy in the range of $E_{N-1}$-$E_N$ to the N channels of the depth distribution spectrum by combining the number in the Nth channel.

The number in the (N−1)th channel of the slow neutron depth distribution spectrum is contributed by neutrons with energy in the ranges of $E_{N-2}$-$E_{N-1}$ and $E_{N-1}$-$E_N$, wherein the contribution of neutrons with energy in the range of $E_{N-1}$-$E_N$ to the number of the (N−1)th channel can be obtained by combining FIG. 4 with the number in the (N−1)th channel of the slow neutron depth distribution spectrum, and then the contribution of neutrons with energy in the range of $E_{N-2}$-$E_{N-1}$ to the number in the (N−1)th channel is equal to the number in the (N−1)th channel minus the number contributed by neutrons with energy in the range of $E_{N-1}$-$E_N$ to the number in the (N−1)th channel.

The number in the (N−2)th channel of the slow neutron depth distribution spectrum is generated by neutrons with energy in the ranges of $E_{N-3}$-$E_{N-2}$, $E_{N-2}$-$E_{N-1}$, and $E_{N-1}$-$E_N$, wherein the contribution of neutrons with energy in the range of $E_{N-1}$-$E_N$ to the number of the (N−2)th channel can be obtained by combining FIG. 4 with the number in in the (N−2)th channel of the slow neutron depth distribution spectrum, the contribution of neutrons with energy in the range of $E_{N-2}$-$E_{N-1}$ to the number in the (N−2)th channel of the depth distribution spectrum can be obtained by combining FIG. 4 with the number in the (N−2)th channel of the slow neutron depth distribution spectrum, and then the contribution of neutrons with energy in the range of $E_{N-3}$-$E_{N-2}$ to the number in the (N−2)th channel of the depth distribution spectrum is equal to the number in the (N−2)th channel of the slow neutron depth distribution spectrum minus the number contributed by neutrons with energy in the range of $E_{N-2}$-$E_{N-1}$ and $E_{N-1}$-$E_N$ in the (N−2)th channel. Similarly, the slow neutron energy spectrum can be obtained after the contributions of neutrons in different energy ranges to all channels of the slow neutron depth distribution spectrum in the shielded barrel were obtained.

From equation (1), it can be identified that when the width of the shielding barrel in the X direction is constant, the slower the speed of the shielding barrel is, the greater the depth range of neutrons in the energy range of <0.4 eV can reach into the barrel. When the speed of the shielding barrel is constant, the wider the width of the shielding barrel in the X direction, the greater the depth range of neutrons in the energy range of <0.4 eV can reach into the barrel.

For the case that the width of the shielding barrel in X direction is 10 cm and the speed of the barrel is 1.3 km/s, the depth range of neutrons in the energy range of <0.4 eV is 650 um, which is much smaller than the smallest pixel size of the position sensitive detectors at the current level of technology. In conclusion, the structure for slow neutron detection and the method for energy spectrum measurement of slow neutrons are completely feasible, which can effectively distinguish the slow neutron with different energies and obtain the slow neutron energy spectrum.

While the disclosure has been illustrated and described in detail in the drawings and foregoing description, such illustration and description are to be considered illustrative or exemplary and not restrictive. The disclosure is not limited to the disclosed embodiments. Other variations to the disclosed embodiments can be understood and effected by those skilled in the art of practicing a claimed disclosure, from a study of the drawings, the disclosure, and the dependent claims.

The invention claimed is:

1. A method for energy spectrum measurement of slow neutrons, using a structure for slow neutron detection, comprising the following steps:

S1) placing the structure for slow neutron detection on a moving equipment with a detector unit of the structure configured to face the movement direction of the equipment directly to obtain the number of slow neutrons reaching different depths within a shielding barrel, and obtaining slow neutron depth distribution spectrum based on the number of slow neutrons at different depths, wherein the slow neutron depth distribution spectrum is divided into N channels; and S2) dividing the energy range of slow neutrons to be detected into N portions corresponding to 0-$E_1$, $E_1$-$E_2$, . . . , $E_{N-1}$-$E_N$ according to the relationship between neutrons' energies and the maximum depths of the slow neutrons that can be reached within the shielding barrel obtained through simulation, wherein $E_N$=E and E is the maximum energy of slow neutrons that can be shielded by the shielding barrel, then the number of slow neutrons in the Nth channel of the slow neutron depth distribution spectrum is generated by the neutrons with energy in the range of $E_{N-1}$-$E_N$, and obtaining the contribution of neutrons with energy in the range of $E_{N-1}$-$E_N$ to the number in N channels of the slow neutron depth distribution spectrum by combining the probability ratio of neutrons with energy in the range of $E_{N-1}$-$E_N$ reaching different depths within the shielding barrel obtained through simulation and the number in the Nth channel of the slow neutron depth distribution spectrum; and S3) the number in the (N−1)th channel of the slow neutron depth distribution spectrum is generated by neutrons with energy in the ranges of $E_{N-2}$-$E_{N-1}$ and $E_{N-1}$-$E_N$, wherein the contribution of the neutrons with energy in the range of $E_{N-1}$-$E_N$ to the number in the (N−1)th channel of the slow neutron depth distribution spectrum is obtained by step S2, and the contribution of the neutrons with energy in the range of $E_{N-2}$-$E_{N-1}$ to the number in the (N−1)th channel of the slow neutron depth distribution spectrum is equal to the number in the (N−1)th channel of the slow neutron depth distribution spectrum minus the number contributed by neutrons with energy in the range of $E_{N-1}$-$E_N$ in the (N−1)th channel; and obtaining the contribution of neutrons with energy in the range of $E_{N-2}$-$E_{N-1}$ to the numbers in the first (N−1) channels of the slow neutron depth distribution spectrum by combining the probability of neutrons with energy in the range SDU-PA240001-US 18 of $E_{N-2}$-$E_{N-1}$ reaching different depths within the shielding barrel obtained through simulation and the number in the (N−1)th channel of the slow neutron depth distribution spectrum, wherein the first (N−1) channels comprising the 1st, 2nd, . . . , (N−2)th, and (N−1)th channel; and S4) the number in the (N−2)th channel of the slow neutron depth distribution spectrum is generated by neutrons with energy in the ranges of $E_{N-3}$-$E_{N-2}$, $E_{N-2}$-$E_{N-1}$ and $E_{N-1}$-$E_N$, wherein the contribution of the neutrons with energy in the range of $E_{N-1}$-$E_N$ to the number in the (N−2)th channel of the slow neutron depth distribution spectrum is obtained by step S2, the contribution of the neutrons with energy in the range of $E_{N-2}$-$E_{N-1}$ to the number in the (N−2)th channel of the slow neutron depth distribution spectrum is obtained by step S3, and the contribution of the neutrons with energy in the range of $E_{N-3}$-$E_{N-2}$ to the number in the (N−2)th channel of the slow neutron depth distribution spectrum is equal to the number in the (N−2)th channel of the slow neutron depth distribution spectrum minus the number contributed by the neutrons with energy in the range of $E_{N-2}$-$E_{N-1}$ and $E_{N-1}$-$E_N$ in the (N−2)th channel, and obtaining the contribution of neutrons with energy in the range of $E_{N-3}$-$E_{N-2}$ to the numbers in the first (N−2) channels of the slow neutron depth distribution spectrum by combining the probability of neutrons with energy in the range of $E_{N-3}$-$E_{N-2}$ reaching different depths within the shielding barrel obtained through simulation and the number in the (N−2)th channel of the slow neutron depth distribution spectrum, wherein the first (N−2) channels comprising the 1st, 2nd . . . , (N−3)th, and (N−2)th channel, and similarly, the slow neutron energy spectrum can be obtained after the contributions of neutrons in different energy ranges to all channels of the slow neutron depth distribution spectrum in the shielded barrel were obtained; and in step S1, assuming that the movement direction of all slow neutrons is perpendicular to the bottom surface of the shielding barrel of the structure for slow neutron detection, then the relationship between the ratio of the maximum depth of neutrons reaching within the shielding barrel to the width of the shielding barrel, the neutron energy and the speed of shielding barrel is described by:

$$\frac{d_{max}}{w} = \frac{v_n \cdot t}{w} = v_n \cdot \frac{1}{v} = \frac{1}{v} \cdot \sqrt{\frac{2E_k}{m_0}} \qquad (1)$$

wherein $d_{max}$ is the maximum depth of a neutron reaching within the shielding barrel, w is the width of the shielding barrel along the movement direction, $v_n$ is the speed of a neutron, v is the speed of the shielding barrel, $E_k$ is the kinetic energy of a neutron, and mo is the rest mass of a neutron; and when the speed of the shielding barrel remains constant, there is a monotonic positive correlation between the kinetic energy of neutrons and the ratio of the maximum depth of neutrons reaching within the shielding barrel to the width of the shielding barrel, thus the energy of slow neutrons can be distinguished based on that to obtain the spectrum of slow neutrons.

2. A method for energy spectrum measurement of slow neutrons according to claim 1, in step S1, resolving the slow neutron energy on the basis of the parameters of the structure for slow neutron detection, which comprises:

setting the maximum depth that a neutron with kinetic energy $E_{k1}$ can reach within the shielding barrel be $d_{max1}$ and setting the maximum depth that a neutron with kinetic energy $E_{k2}$ can reach within the shielding barrel be $d_{max2}$, respectively, then:

$$d_{max1} = \frac{w}{v} \cdot \sqrt{\frac{2E_{k1}}{m_0}} \qquad (2)$$

$$d_{max2} = \frac{w}{v} \cdot \sqrt{\frac{2E_{k2}}{m_0}} \qquad (3)$$

and dividing equation (2) by equation (3), then:

$$\frac{d_{max1}}{d_{max2}} = \sqrt{\frac{E_{k1}}{E_{k2}}} \qquad (4)$$

and then the resolution of slow neutron energy by the structure for slow neutron detection can be characterized via equation (4).

3. A method for energy spectrum measurement of slow neutrons according to claim 1, wherein the structure for slow neutron detection comprises:

a shielding barrel, which is configured as a square with an opening;

a detector unit, which is a slow neutron detector with position resolution function, and the detector unit is completely wrapped in the shielding barrel.

4. A method for energy spectrum measurement of slow neutrons according to claim 3, wherein the shielding barrel is a square barrel made of Gd, and the thickness of the shielding barrel wall is 1 mm to block neutrons with energy <0.4 eV.

5. A method for energy spectrum measurement of slow neutrons according to claim 3, wherein the shielding barrel is a square barrel made of Cd, and the thickness of the shielding barrel wall is 1 mm to block neutrons with energy <0.4 eV.

6. A method for energy spectrum measurement of slow neutrons according to claim 3, wherein the shielding barrel is a square barrel made of aluminum-based boron carbide with a boron carbide content of 40%, and the thickness of the shielding barrel wall is 5 mm to block neutrons with energy <2 eV.

7. A structure for slow neutron detection according to claim 3, wherein the depth of the shielding barrel is 10 cm, and the bottom area of the space into the barrel is 10*10 cm².

* * * * *